United States Patent [19]

Fardin

[11] 4,391,560
[45] Jul. 5, 1983

[54] LID INFEED FOR SPINNING ROD RESTACKER

[75] Inventor: Carlos Fardin, Paterson, N.J.

[73] Assignee: Van Dam Machine Corporation of America, West Paterson, N.J.

[21] Appl. No.: 311,217

[22] Filed: Oct. 14, 1981

[51] Int. Cl.³ .............................................. B65G 47/24
[52] U.S. Cl. ...................................... 414/107; 53/532; 53/542; 198/406; 198/462
[58] Field of Search ....................... 414/103, 107, 109; 198/406, 462, 786; 53/532, 542

[56] References Cited

U.S. PATENT DOCUMENTS

| | | | |
|---|---|---|---|
| 2,104,657 | 1/1938 | Bombard | 414/107 |
| 3,311,218 | 3/1967 | Lederer | 198/400 |
| 3,463,293 | 8/1969 | Lederer | 198/436 X |
| 3,503,486 | 3/1970 | Alexander et al. | 414/107 X |
| 3,741,366 | 6/1973 | Van Melle et al. | 414/107 X |
| 3,827,582 | 8/1974 | Lederer | 414/107 |

Primary Examiner—Leslie J. Paperner
Attorney, Agent, or Firm—David A. Jackson

[57] ABSTRACT

An assembly for use in a container lid conveyor apparatus serves to transfer container lids disposed on a generally horizontal conveyor, to disposition in a continuous stack of such lids balanced on their rims, and undergoing continuous rotation during the operation of the apparatus. This transfer is accomplished at speeds of up to 300 units per minute by an assembly comprising a chute having an upper and a lower vertical slideway, and an intermediate slideway inclined simultaneously forward and sidewise at acute angles with respect to the vertical, to guide the container lids forward to the stack. Side walls are associated with the chute along at least a portion of its lateral periphery, and a movable wall is disposed at the lower lateral periphery of the chute, in cooperative disposition with the side walls, to assist in guiding the descending container lids, and imparting a surface rotation to the lids that prepares them for reception by the spinning rods associated with the stack. A horizontally pivotable gate is suspended from its pivot axis adjacent the upper and intermediate slideways of the chute, to retain the container lids in the chute as they travel downward therethrough. The design of the present assembly assures that each container lid will be deposited adjacent the stack in spaced relation to the next arriving container lid, so that jam ups will not occur. Also, the rotation imparted by the movable wall complements the rotation of the spinning rods, so that premature ejection or jam up of container lids landing on the spinning rods, is avoided and eliminated.

15 Claims, 6 Drawing Figures

LID INFEED FOR SPINNING ROD RESTACKER

BACKGROUND OF THE INVENTION

1. Field of the Invention

The present invention relates to apparatus for stacking and conveying container lids, and more particularly to an assembly for the transfer of the lids from a horizontal, spaced apart position on a moving conveyor belt, to an upright vertical spinning position.

2. Description of the Prior Art

The manufacture of lids for disposable as well as reusable containers designed for a variety of packaging needs, generally includes the conveyance of the container lids through a sequence of operations, including printing on one surface thereof of various commercial indicia. Generally, the container lids are introduced on to a horizontal conveyor where they reside in spaced apart position, where printing or other operations may be performed on them.

A variety of conveyor apparatus has been developed and utilized to transport and stack container lids of various sizes and utilities. Such apparatus operate continuously, and achieve commercial speeds of about 300 lids per minute. Generally, such apparatus includes an output section where the container lids are transferred from the horizontal conveyor to a vertical, rotating stacked arrangement, where they may be transferred or otherwise prepared for shipment. One particular type of lid conveying apparatus utilizes the principle of gyroscopic precession, as outlined in U.S. Pat. No. 3,463,293, to Lederer, to stack the lids on their rims, and maintain the lids closely adjacent and axially aligned with each other in motion, to facilitate such transport and packaging.

Generally, the output end of such apparatus includes a device such as a chute or the like, that facilitates the movement of the generally horizontal container lids into the vertical plane for reception by the spinning rods. A particular such device, including a lid orienting mechanism is disclosed in U.S. Pat. No. 3,311,218, also to Lederer. The mechanism of this patent is specifically designed to facilitate the orientation of the container lid so that lids that have been oppositely disposed on the horizontal conveyor, may nonetheless be converted to the proper vertical alignment on the spinning rods. The Lederer device provides a direct vertical chute that may terminate at the spinning rod stacking device.

One of the problems that attends the use of the chute in conjunction with the spinning rod arrangement, is that container lids occasionally misfeed from the chute and either disrupt the vertical stack on the spinning rods, or are totally ejected from such stack. Ejection may occur because of the manner in which the spinning rods operate. Specifically, both rods spin in the same direction, for the purpose of imparting a tangential, gyroscopic spin of opposite direction to the container lids, to keep the lids stable in the vertical position as illustrated in the Lederer Patent. It can be seen, that the initial contact of a container lid with one, rather than both of the spinning rods, could cause that container lid to eject from the apparatus.

A further difficulty with the use of the vertical chute in conjunction with the spinning rods, arises from the occasional instability of container lids initially contacting the spinning rods, due to inadequate preliminary preparation or "prespinning" of the container lids. Generally, because of the forces exerted by the spinning rods, it is advisable to prepare the container lids by imparting some complementary rotation to them as they move toward the rods. This generally facilitates the assumption by the container lids of a stable residence on the rods, which in turn lends stability to the spinning stack. Prior art mechanisms for imparting such spinning have been generally inadequate, and, at most, consist of free wheeling rollers disposed adjacent the mouth of the vertical chute, to cause passing container lids to assume some initial rotation in their movement. Such rotation is generally inadequate, and the container lids may wobble and cause instability to the remainder of the stack.

This latter problem is compounded, by the design of the conventional chute, as the container lids are usually dropped directly vertically downward, and thereby may land in contact with the next adjacent rotating container lid. This manner of delivery can cause instabilities and disruption, in the instance where a container lid unexpectedly accelerates and drops to the spinning rods, before the previous lid can move out of the way.

A need therefore exists for the development of a means for transferring the container lids from the horizontal conveyor to the vertical spinning rods at the high speeds of commercial operation, with minimum operating disruption.

SUMMARY OF THE INVENTION

In accordance with the present invention a container lid conveyor apparatus having at its output end, a generally horizontal vacuum conveyor that terminates at paired, horizontally rotating, spinning rods adapted to receive and maintain said container lids in rotating stacked relationship adjacent each other, includes an assembly for transferring the container lids from their end-to-end disposition on the conveyor, to the stack rotating in the vertical plane.

The assembly of the present invention comprises a chute disposed adjacent and above the spinning rods, having an upper and a lower vertical slideway, and an intermediate slideway inclined forward in perpendicular vertical planes, at an acute angle with respect to the vertical, to guide the container lids forward and sidewise to the spinning support rods. Paired side walls are associated with the chute along at least a portion of its lateral periphery, to guide and retain the container lids as they pass along the slideways. A movable wall is located with its longitudinal dimension at an acute angle with respect to the vertical, and is proximate to one of the spinning rods. The movable wall has a unidirectional movement that complements the surface rotation of the adjacent spinning rod, and is positioned to receive and impart surface rotation to the circumferential rim of the descending container lids.

The assembly includes a horizontally pivotable gate located forward of the chute and in a plane parallel to the upper and intermediate slideways. The gate is provided to retain the container lids against the slideways as they travel downward along them. A handle optionally including a weight, is provided on the outer surface of the gate, to facilitate outward pivoting of the gate to remove possible lid jam ups, while allowing the gate to return to its position adjacent the chute.

The two dimensional incline of the intermediate slideway of the chute, facilitates both the spaced deposit of the container lids, and the impact of the container lids through their travel, upon the movable wall, to enable the container lids to assume a surface rotation corresponding to the rotation of the spinning rods.

Accordingly, it is a principal object of the present invention to provide a means for the transfer of the container lids from a conveyor belt to a stack disposed upon horizontally spinning rods, that avoids container lid ejection and stack disruption.

It is a further object of the present invention to provide such transfer means as aforesaid, that facilitates the spaced deposit of the container lids on the spinning rods, to avoid collision between consecutive container lids.

It is a further object of the present invention to provide a transfer means as aforesaid that provides a uniform surface rotation to each container lid that corresponds to the surface rotation of the receiving spinning rods.

It is a yet further object of the present invention to provide a transfer means comprising an assembly that is of simple and durable construction.

Other objects and advantages will become apparent to those skilled in the art from a review of the ensuing description which proceeds with reference to the following illustrative drawings.

DETAILED DESCRIPTION

Figure 1:
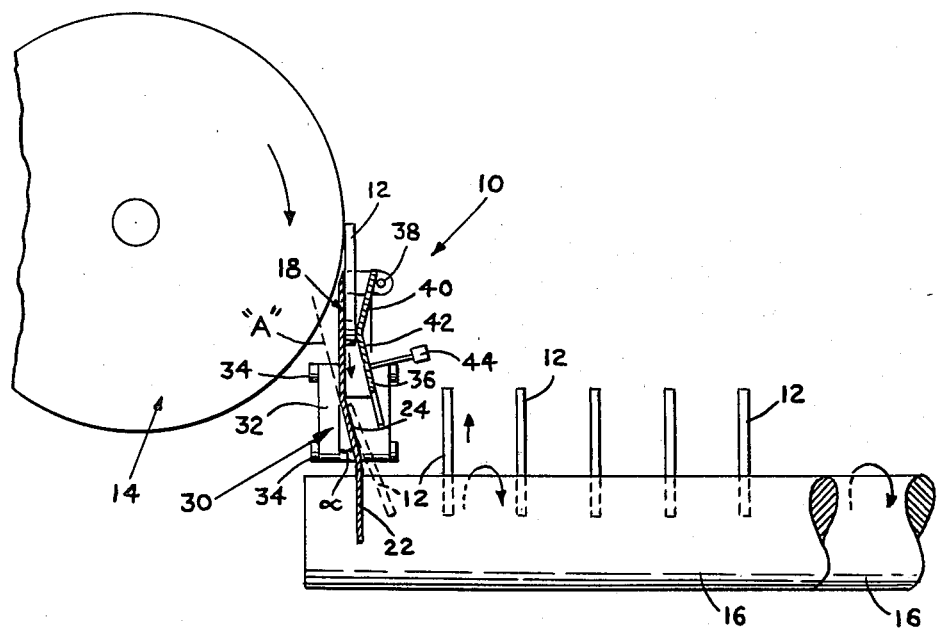
FIG. 1 is a fragmentary, schematic side sectional view showing the assembly of the present invention.

Referring to the FIGURES wherein like numerals designate like parts, and particularly with reference to FIG. 1, transfer assembly 10 is shown in a side sectional view, as part of a combined apparatus for the transport of container lids, illustrated by example at 12. The pertinent parts of the lid conveying apparatus are shown schematically, and comprise the belt and suction wheel of a conveyor 14 that transports the conveyor lids through the apparatus. Conveyor 14 generally transports the lids from a previous printing operation, not shown herein, and the lids are disposed in generally horizontal, end-to-end spaced relation to each other.

From the conveyor 14, the lids are transferred to a stacked, spinning arrangement on spinning rods such as illustrated at 16. The container lids 12 are therefore set up in a constantly moving stack straddling the spinning rods 16, with their major surfaces located in the vertical plane. When the stack extends the length of the spinning rods, it may be removed and transferred to the next operation in the manufacturing process, which usually comprises packaging for storage or shipping.

A problem that has attended the transfer of the container lids 12 from the conveyor 14 to the spinning rods, or other edge stacking device, has been that ejections and jam ups frequently occur. In the instance where the stacking device comprises spinning rods 16, and the spinning rods are rotating in the direction indicated by the arrow in FIG. 1, the general tendency is for the container lid to drop first onto the spinning rod which may be viewed, with reference to FIG. 4 in the right-hand side of the FIGURE. Impact upon this first right-hand spinning rod tends, because of the vector force of rotation, to throw the container lid 12 in the left-hand direction, again with reference to FIG. 4, whereby an ejection of the container lid takes place.

A second problem is apparent with reference to FIG. 1. In this instance, the downward travel of a container lid 12, not shown, can nonetheless impact the edge of a container lid 12 immediately in front of it, before that latter container lid 12 has had a chance to move forward along spinning rods 16. In such instance, the collision of the two container lids will have the effect of disturbing the positioning of all container lids on the spinning rods, and may well disrupt the entire stack.

To remedy the above noted problems, transfer assembly 10 utilizes at least one chute 18 that is disposed between the conveyor 14 and spinning rods 16 as shown in FIG. 1. Chute 18 comprises an upper vertical slideway 20, a lower vertical slideway 22 and an intermediate slideway 24 that is located at an angle with respect to the vertical planes that contain slideways 20 and 22.

Figure 2:
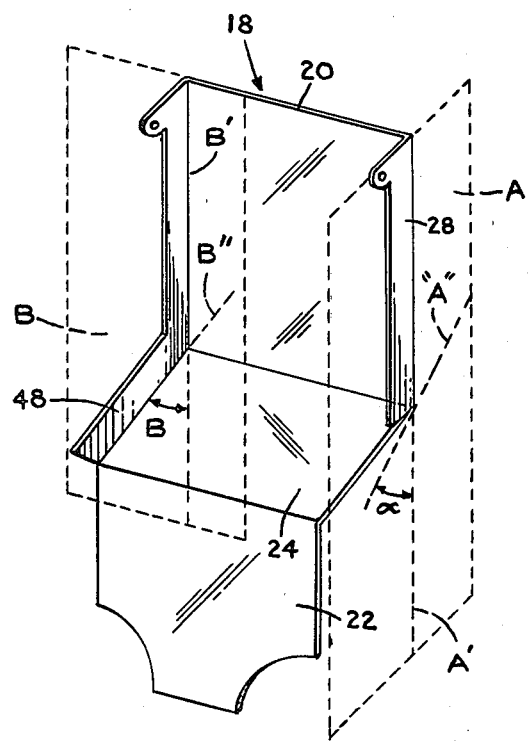
FIG. 2 is a perspective view showing the chute of the assembly of the present invention in greater detail.

Referring now to FIG. 2, chute 18 includes two side walls, comprising angulated side wall 26 and straight side wall 28. Both side walls extend along the lateral periphery of chute 18, and minimize lateral movement of the downwardly traveling container lids 12.

Figure 4:
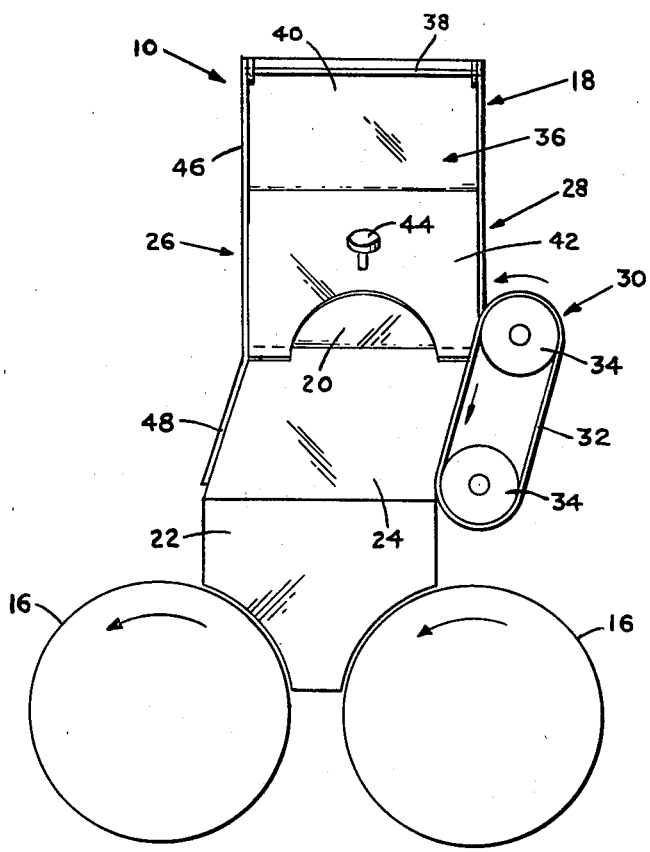
FIG. 4 is a front view partly in phantom illustrating the present invention.

Assembly 10 includes at least one movable wall 30, shown best in FIGS. 1 and 4, that is disposed with its longitudinal dimension at an angle with respect to the vertical, and extends from proximity with straight side wall 28, to the adjacent spinning rods 16. As shown by the arrow in FIG. 4, movable wall 30 has a direction of movement that complements the surface rotation of the proximate spinning rod, i.e. counterclockwise as illustrated, and thereby imparts a surface rotation to the rims of the container lids 12 that facilitates a smooth transition of the container lid, from the chute 18, to the spinning rods 16. Preferably, movable wall 30 comprises a conveyor consisting of a continuous belt 32 supported and rotated about parallel rollers or the like, 34.

Assembly 10 also includes at least one horizontally pivotable gate 36, shown in both FIGS. 1 and 4, that is located forward of chute 18. Gate 36 is suspended from a horizontal axis 38 and defines a cross section that is essentially parallel to the cross section defined by upper vertical slideway 20 and intermediate slideway 24. Gate 36 thus defines an upper vertical segment 40 that corresponds approximately in length with upper vertical slideway 20, and a lower canted segment 42 that similarly corresponds with intermediate slideway 24. Gate 36 is adapted to swing freely about axis 38 to retain container lids 12 against chute 18, between walls 26, 28 and 30. To this end, a weight may be disposed on gate 36 and preferably is provided in the form of a weighted handle 44, mounted frontally on canted segment 42, and extending away from chute 18 as shown in the FIGURES.

CHUTE

Referring again to FIGS. 1 and 2, chute 18 is distinctive in that it provides an angulated intermediate slideway 24, that, by its configuration serves two essential functions. Referring to FIG. 1, slideway 24 is canted at an angle with respect to the vertical, labeled angle α, that urges downwardly passing container lids 12 outward at an angle with respect to the vertical, so that they make contact with the spinning rods 16 at a point removed from the base of chute 18. This translational displacement is illustrated in FIG. 1 by the disposition of a container lid 12, shown in phantom, adjacent intermediate slideway 24. Thus, as container lid 12 moves away from assembly 10, it is located out of the way of the next succeeding container lid 12 that drops down therethrough.

The angle α at which intermediate slideway is disposed with respect to the vertical, optimally ranges up to about 20°, as this will provide sufficient canting of the container lid 12 to permit it to assume a stable vertical position along spinning rods 16, that puts it out of the range of impact with the next succeeding container lid. Preferably, the angle α ranges from about 15° to about 20°.

In addition to this forward angulation of intermediate slideway 24, chute 18 is further distinctive in that intermediate slideway 24 is canted at an acute angle with respect to the vertical, in a plane perpendicular to the plane containing angle α. In particular, in FIG. 2, angle α is shown disposed in a plane A that lies perpendicular to the major surface of upper slideway 20 and lower slideway 22. Thus, angle α indicates a forward tilt or cant of intermediate slideway 24.

Also, however, intermediate slideway 24 is disposed so that its line of travel is not directly vertically downward, but is also at an angle with respect to the vertical. This angle is shown as contained within a plane B which lies perpendicular to plane A and contains the major surface of upper vertical slideway 20. The angle labeled β, like the angle α preferably is acute, and ranges up to about 20°, with respect to the vertical. The vertical in FIG. 2 is illustrated by a line labeled B' while the angle is subtended by the line B'', that passes through a lateral edge of intermediate slideway 24 as shown. In similar fashion, line A' comprises the vertical dimension in plane A, while line A'' passes through the longitudinal dimension of intermediate slideway 24, as shown more clearly in FIG. 1.

The significance of this second angle β, better seen in FIG. 4, is to encourage the downwardly passing container lids 12, to impact upon the surface of movable wall 30, so that surface rotation of the container lids 12 can be imparted. Furthermore, the container lids after contacting the moving surface of movable wall 30, and gaining rotation therefrom, are directed toward the spinning rod located in the left-hand portion of FIG. 4, so that the commencement of rotating contact with the spinning rods 16 does not result in lid ejection. The cooperation of movable wall 30 with intermediate slideway 24 to achieve this result, will be discussed herein later on.

Side walls 26 and 28 are provided as indicated earlier, to retain the downward traveling container lids, and to prevent unwanted lateral movement. In particular, angulated side wall 26 comprises an upper portion 46 that is parallel to straight side wall 28 and a lower portion 48 that resides parallel to the angulated periphery of intermediate slideway 24. Lower portion 48 provides an effective retainer against the possible ejection of a container lid 12 after it drops down and makes contact with the belt 32 of movable wall 30. It is possible in this stage of passage of container lid 12, that its impact against the belt 32 may result in lateral movement away from movable wall 30 and out of chute 18. Thus, lower portion 48 must extend a distance sufficient to prevent this from occurring.

A second consideration, however, can be appreciated by a review of FIG. 4. At the point where the container lid 12 has contacted movable wall 30 and is now spinning while traveling downward, it reaches a point of contact with the rotating surfaces of spinning rods 16, where it must be capable of leaving the present assembly 10. In such instance, it is advisable that all impediments to such movement should be removed. As shown in FIG. 4, both the lower canted segment 42 of the gate 36, and the lower portion 48 of angulated side wall 26 terminate at a distance away from spinning rods 16 to permit the container lid 12 to commence its gyroscopic precession and movement from contact with intermediate slideway 24 into a vertical position on the spinning rods 16. In accordance with the present invention, the lowermost termination of angulated side wall 26 is within one container lid diameter of the upper tangent point of the rods 16. Resultingly, the lower portion of the angulated side wall 26 extends to about the radial midpoint of the container lid 12, and thereby keeps it in position. The lower segment 42 of gate 36 is illustrated with a semicircular cutout, and may terminate at the high point thereof, so as to provide minimal obstruction to the container lid 12 at its exit from assembly 10.

Figure 3:
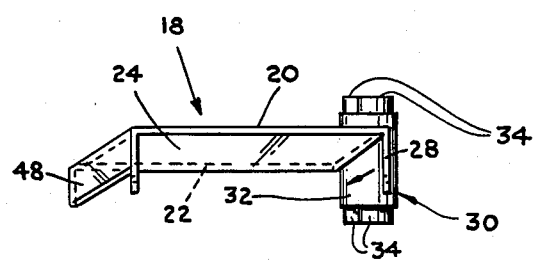
FIG. 3 is a top view partly in phantom showing the chute and movable wall of the assembly of the present invention.

Referring again to FIG. 1, vertical slideways 20 and 22 can be visualized as residing in planes that are essentially parallel to each other. Slideways 20 and 22 are separated due to the angulated connection provided by slideway 24. The exact space between the planes containing slideways 20 and 22 is not critical, but should preferably be greater than the height of the container lid 12 being transported through assembly 10. In particular, this distance may range from about 1 to about 2 container heights, such height measured as the thickness of the container lid 12 as shown in the FIGURES. This displacement, also shown in FIG. 3, provides a sufficient distance between the terminus of the assembly 10, and the point of contact made by the descending container lid 12, so that collision between consecutive container lids is avoided.

While the foregoing limitations and constructions shown in the FIGURES and the accompanying description may be utilized with success, it is to be understood that such dimensions and shapes may vary within the scope of the invention, so long as the container lids 12 are permitted to pass unobstructed from assembly 10 to assume essentially vertical rotating position upon spinning rods 16. Thus, the semicircular cutout of lower canted segment 42, and the exact point of termination of lower portion 48 of side wall 26, may both vary within the scope of the present invention.

MOVABLE WALL

Movable wall 30 cooperates with chute 18 as discussed earlier, to guide and propel the container lids 12 toward stable residence on the spinning rods 16. Movable wall 30 may be seen with reference to FIGS. 1, 3 and 4, and comprises essentially a conveyor having a rotating belt 32 that resides adjacent the angulated periphery of intermediate slideway 24, and, may reside substantially parallel to lower portion 48 of angulated side wall 26. Straight side wall 28, mentioned earlier, cooperates with movable wall 30 to help retain the downwardly moving container lids 12, to prevent unwanted lateral movement in their direction. It can be seen from FIG. 3, that a downwardly descending container lid 12 is likely to make tangential contact with the movable wall 30, and may rebound forward therefrom. In particular, movable wall 30 is disposed at an angle similar and preferably equal to the angle β subtended by the lateral periphery of intermediate slideway 24, discussed earlier and with reference to FIG. 2. In this way, the container lids 12 impinging on movable wall 30 are given a surface rotation while disposed at an angle with respect to the vertical, that provides a forward thrust that propels the container lids 12 along the spinning rods 16, and assists lids 12 to assume the desired gyroscopic stability thereon.

Belt 32 rotates in a direction indicated by the arrows in FIG. 4, that corresponds to the direction of rotation of spinning rods 16, so that the appropriate rotation is imparted to the container lids 12. Preferably, the speed of rotation of movable wall 30 should be comparable or equal to the surface rotation of the spinning rods 16, so that the container lids will attain the rotation necessary to assume their position on spinning rods 16 without the occurrence of jarring of the lids and attending instability, that can occur when the respective speeds of rotation substantially differ. For example, in the instance where the movable wall 30 and spinning rods 16 are roughly of the size illustrated herein, rollers 34 should rotate at a speed of about 3 times that of spinning rods 16, to enable belt 32 to achieve a surface speed equivalent or equal to the surface speed of rotation of the spinning rods. Naturally, the exact speeds of rotation may vary, depending upon the size of rollers 34, the distance between rollers 34 and the size of spinning rods 16. The foregoing is therefore to be considered as illustrative only.

Movable wall 30 is mounted adjacent intermediate slideway 24 as illustrated, and may be supported by mounting brackets or the like, not shown herein, to maintain its stability and disposition. Likewise, rollers 34 may be motor actuated by conventional means, not shown, and may be connected thereto by conventional transmission means, including belts, gears, drive chains and the like. The choice of the specific linkage between the actuating means and the rollers 34 is not critical, and may vary within the skill of the art.

GATE

Gate 36, discussed earlier, comprises a horizontally pivotable flap-like structure mounted forward and outboard of chute 18 for the purpose of further confining and retaining container lids 12 as they make downward traversal of chute 18. As shown in FIG. 1, gate 36 is disposed in slightly spaced apart relation to chute 18, and is mounted with its axis of rotation disposed in the horizontal plane. Pivot axis 38 thus allows gate 36 to pivot in the vertical plane, both toward and away from the slideways of chute 18. The pivoting action of gate 36 permits container lids 12 traversing chute 18, that may extend forward and out of chute 18, to pass without jamming between the gate and the chute. Also, gate 36 may pivot forward to permit clearance of chute 18, in the event that a jam or obstruction of chute 18 occurs during operation of assembly 10.

Gate 36 is retained in the position shown in FIG. 1, and is inhibited from pivoting away from chute 18, by the provision of a weighted handle 44. Handle 44 is attached to the lower canted segment 42 of gate 36, and provides a means for grasping and moving gate 36, as desired. Naturally, other means for providing appropriate weight attached to gate 36 may be utilized, such as the preparation of canted segment 42 from a heavy material. The invention should therefore not be limited to the provision of a weighted handle such as illustrated herein.

As noted earlier, gate 36 is designed to provide yieldable retention of the container lids 12, but, like lower portion 48 of angulated side wall 26, terminates at a point that facilitates the escape of the container lid 12 from the assembly 10, when such is appropriate. Thus, as noted earlier, a semicircular lower perimeter or border may be defined by canted segment 42, to permit clearance of the upper perimeter of the container lid 12, when it extends fully into contact with the spinning rods 16. Likewise, and as discussed earlier, the cross-sectional configuration of gate 36 corresponds approximately to that of the upper vertical slideway 20 and intermediate slideway 24 of chute 18, to provide a pathway for the container lids 12 that is essentially uniform in its horizontal dimensions. Such uniformity, however, is not strictly necessary, as the movement of the gate 36 during operation of assembly 10, may result in fluctuations in the horizontal dimensions of the space defined between chute 18 and gate 36.

OPERATION

Figure 5:
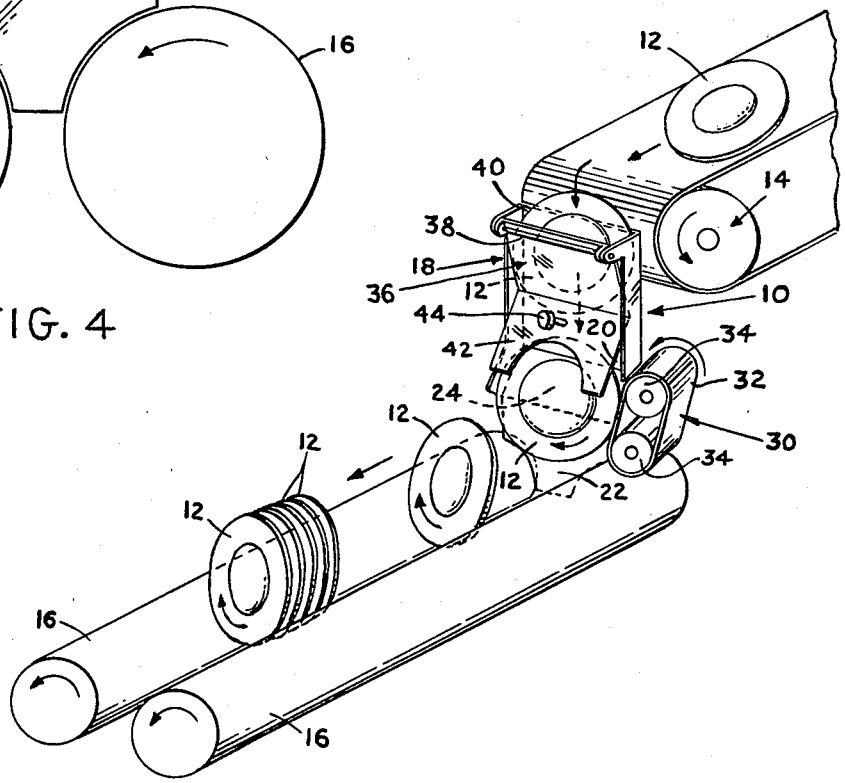
FIG. 5 is a broken perspective view partly in phantom showing the operation of the present invention.

Referring now to FIG. 5, a schematic illustration of the operation of the present invention is shown. A plurality of container lids 12 are seen to be conveyed in spaced apart end-to-end relationship along conveyor 14. The lids 12 drop consecutively into chute 18, into the space defined between chute 18 and gate 36. The lids then drop vertically downward, along upper vertical slideway 20, until they make edge contact with the downward rotating belt 32 of movable wall 30.

As lids 12 make contact with movable wall 30, they commence rotation, as indicated by the arrows, and are shunted sideways along intermediate slideway 24, until they make tangential contact with spinning rods 16. In particular, the sidewise angulation of movable wall 30 and the cooperative angulation of lower portion 48 of angulated side wall 26, causes the container lids 12 to make contact with the spinning rods 16 furthest removed from movable wall 30 and most adjacent to the lower terminus of lower portion 48. The initial contact of the container lid 12 with this particular spinning rod 16, together with the retention offered by movable wall and angulated side wall 26, allows container lid 12 to assume a stable situation upon spinning rods 16, and discourages premature ejection of the container lids.

Also, as discussed earlier, and with reference to FIG. 1, the angle of delivery of container lids 12 to spinning rods 16, together with the rotation imparted by movable wall 30, creates a forward thrust that propels container lids 12 forward along spinning rods 16, and thereby assists container lids in escaping from assembly 10 more quickly, to make room for the next consecutive container lid traversing assembly 10.

As shown in FIG. 5, a plurality of container lids 12 thus assume stable rotational disposition along spinning rods 16, in a manner already known in the art, and develop a continuous stack of such lids, that may be removed for packaging for shipment, or transfer for further processing.

Figure 6:
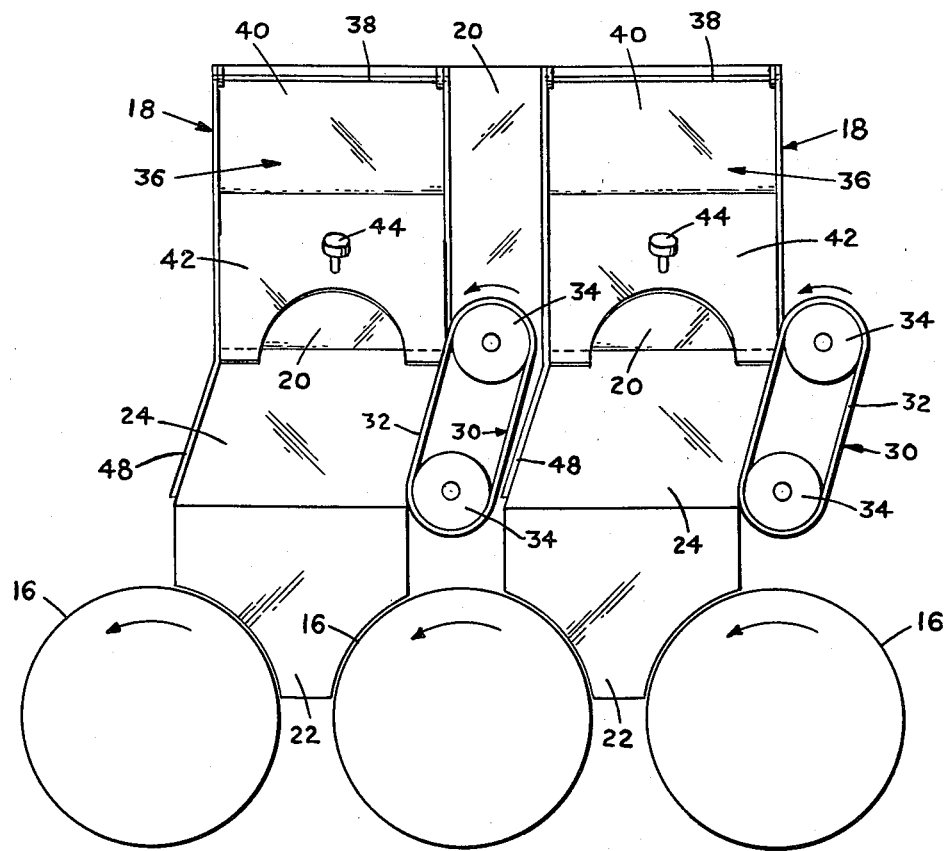
FIG. 6 is a front view similar to FIG. 4 illustrating a multiple assembly in accordance with the present invention.

While the primary illustrations have dealt with the provision of a single transfer assembly 10 for use with a single pair of spinning rods 16, the present invention contemplates a multiplicity of such assemblies 10, located in side-by-side relation, with a plurality of spinning rods 16. Such a multiple arrangement is illustrated schematically in FIG. 6, where paired, side-by-side chutes 18 are shown, for association with three equally spaced spinning rods 16. The provision of three spinning rods 16 to maintain two parallel rotating stacks of container lids 12 is known, and does not per se form a part of the present invention. The utilization, however, of a multiple assembly arrangement, as shown in FIG. 6, does confer economy, and permits the development of machinery for continuous multiple processing of container lids. In such instance, the chutes 18 may be prepared as an integrated structure defining the parallel slideways 20, 22 and 24. Movable walls 30 may be disposed in the intermediate fashion as shown, and parallel gates 36 may be hingeably disposed adjacent their respective slideways. In all of the respects, however, this multiple arrangement will function in the same fashion as the single arrangement discussed above.

The present assembly may be prepared from a variety of well known materials that are useful for machinery of this type. Thus, the chute, including the slideways, and the stationary rails, may be fashioned from a metal having a smooth surface in all areas where container lids 12 are to pass. Metal such as 316 stainless steel, aluminum, and the like, would be suitable. Also, acceptable plastics able to withstand the rigors of machinery operation would be acceptable.

The rollers 34 may likewise be wholly prepared from metal, or may be prepared from appropriate plastic or rubber material. Belt 32 is advantageously prepared from an elastomeric material that provides acceptable flexibility and frictional properties, favorable for imparting rotation to the edges of container lids 12.

Finally, gate 36 may be constructed from a variety of materials, but is preferably constructed from a translucent plastic, to facilitate easy inspection during operation of assembly 10, to determine the location of jam-ups, if any, that may develop. Naturally, the particular materials suggested herein are illustrative only, as the present invention is not limited as to the type of materials that may be used in its construction.

It is to be understood that the invention is not limited to the illustrations described and shown herein, which are deemed to be merely illustrative of the best modes of carrying out the invention, and which are suitable of modification of form, size, arrangement of parts and details of operation. The invention rather is intended to encompass all such modifications which are within the spirit and scope and defined by the claims.

What is claimed is:

1. An assembly for the transfer of container lids from the end-to-end prone disposition on a conveyor, to a stack thereof with the lids supported on their rims between at least two spinning rods rotating about a generally horizontal axis, comprising:
   A. at least one chute disposed adjacent and extending above said stack, having an upper and a lower vertical slideway, and an intermediate slideway defining a two dimensional forward incline, said incline in two adjacent perpendicular planes and at an acute angle with respect to the vertical dimension, to guide said container lids forward and sidewise to said stack;
   B. at least one pair of side walls associated with said chute along at least a portion of the lateral periphery thereof, to guide and retain said container lids as they pass along said slideways;
   C. at least one movable wall disposed with its longitudinal dimension at an acute angle with respect to the vertical, and proximate to one of said spinning rods, said movable wall having a movement complementary with the surface rotation of the proximate spinning rod, and positioned to receive and impart surface rotation to the rims of the descending container lids; and
   D. at least one horizontally pivotable gate located forward of said chute and in a plane generally parallel to said upper and said intermediate slideways, to retain said container lids traveling downwardly thereon.

2. The assembly of claim 1 wherein the planes containing said upper and said lower vertical slideways are separated from each other by a distance greater than the height of said container lids.

3. The assembly of claim 2 wherein said distance ranges from about 1 to about 2 times the height of said container lids.

4. The assembly of claim 1 wherein said upper and said lower slideways, and said intermediate slideways are integral with each other, and said intermediate slideway joins said lower slideway along a horizontal line corresponding to the horizontal radius of a container lid at rest in said stack.

5. The assembly of claim 1 wherein the acute angle defined by said intermediate slideway ranges up to about 20°.

6. The assembly of claim 5 wherein said acute angle ranges from about 15° to about 20°.

7. The assembly of claim 1 wherein said side walls comprise a first angulated side wall extending along the periphery of said upper and said intermediate slideways, and a second straight side wall extending vertically downward along the laterally opposed periphery of said upper slideway, and terminating at the junction with said intermediate slideway,
   said movable wall disposed adjacent the free lateral periphery of said intermediate slideway, and extending between said straight side wall and the spinning rod most adjacent thereto.

8. The assembly of claims 1 or 7 wherein said movable wall comprises a rotatable conveyor belt.

9. The assembly of claim 8 wherein said conveyor belt is disposed with its broad surfaces in parallel relation to the portion of said angulated side wall disposed adjacent said intermediate slideway.

10. The assembly of claim 9 wherein the broad surface of said conveyor belt rotates in the generally vertical downward direction adjacent the line of travel of said container lids.

11. The assembly of claim 10 wherein said conveyor belt rotates at a speed sufficient to impart to said container lids, a surface speed equal to that of said spinning rods.

12. The assembly of claim 1 wherein said gate is vertically suspended from its pivot axis.

13. The assembly of claim 1 wherein said gate has a cross-sectional shape corresponding to the cross-sectional shape defined by said upper and said intermediate slideways.

14. The assembly of claim 13 wherein said gate includes a handle attached and extending therefrom and away from said chute.

15. The assembly of claim 1 wherein a multiplicity of said chutes, side walls, movable walls and gates are respectively disposed in side-by-side relation to each other.

* * * * *